US 6,715,053 B1

(12) United States Patent
Grigor

(10) Patent No.: US 6,715,053 B1
(45) Date of Patent: Mar. 30, 2004

(54) METHOD AND APPARATUS FOR CONTROLLING MEMORY CLIENT ACCESS TO ADDRESS RANGES IN A MEMORY POOL

(75) Inventor: Gordon F. Grigor, Toronto (CA)

(73) Assignee: ATI International SRL, Hastings (BB)

( * ) Notice: Subject to any disclaimer, the term of this patent is extended or adjusted under 35 U.S.C. 154(b) by 206 days.

(21) Appl. No.: 09/699,858

(22) Filed: Oct. 30, 2000

(51) Int. Cl.[7] ............................................. G06F 12/02
(52) U.S. Cl. .................... 711/170; 711/163; 711/153; 711/152
(58) Field of Search ................ 711/152, 153, 711/163, 170, 173, 133, 134; 345/533, 531, 541

(56) References Cited

U.S. PATENT DOCUMENTS

| | | | | |
|---|---|---|---|---|
| 5,848,435 A | * | 12/1998 | Brant et al. ................. | 711/152 |
| 5,964,835 A | * | 10/1999 | Fowler et al. ............... | 709/216 |
| 6,047,356 A | * | 4/2000 | Anderson et al. ........... | 711/129 |
| 6,247,109 B1 | * | 6/2001 | Kleinsorge et al. .......... | 712/13 |
| 6,311,255 B1 | * | 10/2001 | Sadana ....................... | 711/147 |
| 6,321,314 B1 | * | 11/2001 | Van Dyke ................... | 711/163 |
| 6,381,682 B2 | * | 4/2002 | Noel et al. .................. | 711/153 |
| 6,449,691 B1 | * | 9/2002 | Arimilli et al. ............. | 711/120 |
| 6,480,941 B1 | * | 11/2002 | Franke et al. ............... | 711/153 |

FOREIGN PATENT DOCUMENTS

JP        410091527 A   *  4/1998  ............ G06F/12/10

OTHER PUBLICATIONS

Silberschatz, A. and Galvin, P., "Operating System Concepts 5th edition", pp. 597–602, 1999.*
Dave Dzatko, Tom Shanley; AGP System Architecture (2nd Edition) by Mindshare, Inc.; Addison–Wesley Pub. Co., Sep. 27, 1999; 9 pages.

* cited by examiner

Primary Examiner—Matthew Kim
Assistant Examiner—Pierre-Michel Bataille
(74) Attorney, Agent, or Firm—Vedder, Price, Kaufman & Kammholz, P.C.

(57) ABSTRACT

An address access control system dynamically forms a plurality of address ranges in a predefined unified address structure during operation of a computer system. A plurality of memory clients is operatively connected to the unified address structure. A plurality of capabilities is also provided with respect to memory clients accessing address ranges. A memory controller is operatively connected to the plurality of memory clients and to the unified address structure. The memory controller dynamically structures an association of a respective range of the plurality of ranges with at least one respective capability of a plurality of capabilities for at least one memory client of the plurality of memory clients.

13 Claims, 4 Drawing Sheets

METHOD AND APPARATUS FOR CONTROLLING MEMORY CLIENT ACCESS TO ADDRESS RANGES IN A MEMORY POOL

FIELD OF THE INVENTION

The present invention relates generally to memory controllers, and in particular to a system and method for controlling address access requests to areas of memory in a computer system.

BACKGROUND OF THE INVENTION

It is well known that computers use system memory, as well as other memory components within the computer system to process data. Current computer systems utilize PCI (Preferred Component Interconnect) based graphics adapters and AGP (Accelerated Graphics Port) based graphics adapters for displaying graphic information. In the absence of a three dimensional graphics display, the task of rendering 2D objects on the displays is a relatively simple one. Perspective defines how objects appear at various viewing positions. In a 2D environment, this typically amounts to a simple scaling of the objects' dimensions to create the illusion of depth. Also fill patterns, such as texture maps, can also be adjusted based on viewing distance.

However, rendering a 3D graphics scene is very different than presenting a 2D picture of the same scene. Today most computers have high quality 3D display capability. For real time 3D rendering, computers divide up the processing required into successive graphics pipeline stages. Graphics pipeline is tied to memory arrays and high speed interfaces. The pipeline processing in the division of real time 3D graphics task requires that data be readily available to feed the pipeline stages.

A graphics processor memory controller can read and write all memory pools (that, is, areas of virtual memory) including video memories, AGP system aperature, system memory and other memories available via PCI. Virtual memory includes system memory and other memory devices that the memory controller uses as a unified address structure There are memory clients that during a graphics process may inadvertently, or accidentally, or even intentionally read from or write to memory locations which could have a negative effect on system behavior. This problem has arisen in modem day computer system architecture, when a memory client has access to all areas of the virtual memory. In today's computers, this virtual memory runs from zero bytes to 4 gigabytes.

In an AGP system architecture, processors can read from or write into main memory. This allows the graphics device driver executing on the processor to access and manipulate graphic data stored in the main memory that will be used by the graphics adapter. The processor can read from and write into the AGP, PCI, integrated local memory and register set of the graphic adapter. This permits the graphics device driver executing on the processor to access and manipulate graphic data stored in a graphic adapter's local memory, and to control the adapter by its register set. The graphics adapter can also read from and write into main memory, i.e., PCI, AGP. In order to perform read operations and write operations with PCI adapters that permit a transfer of video information to and from other devices, the PCI adapters also read from and write to main memory. Furthermore, PCI adapter can read information and write to a graphic adapter's local memory. For example, a PCI based video capture device performs PCI write transactions to dump video information into the graphic adapter's local memory for processing.

Different functionalities, which need to access different memory areas of the virtual memory of the memory controller are referred to as memory clients. Since one or more memory clients typically have access to all of the memory in the computer system, various prior art approaches have been used to prevent conflicts or other problems in system behavior. For example, it is known to structure the systems such that memory clients cannot access an entire memory pool. However, this restricts the functionality of the clients artificially and is a drawback for many computer systems. Also it is known in the prior art to have a system wherein the memory client has access granted to the memory pool before operations occur, and never after operations are completed. However, this requires an unnecessary amount of set up overhead per operation.

Thus, there is a need in the prior art for an improved system, which can handle memory accesses that are requested by the memory clients in a computer system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements.

DETAILED DESCRIPTION OF A PREFERRED EMBODIMENT OF THE INVENTION

In general, the present invention is an address access control system or memory controller. A plurality of address ranges is formed in a predefined unified address structure during operation of the computer system. A first plurality of clients is operatively connected to the unified address structure. A plurality of capabilities is also provided with respect to clients accessing address ranges. A memory controller is operatively connected to the plurality of clients and to the unified address structure. The memory controller dynamically structures an association of a respective range of the plurality of address ranges with at least one respective capability of a plurality of capabilities for at least one client of the plurality of clients.

Figure 1:
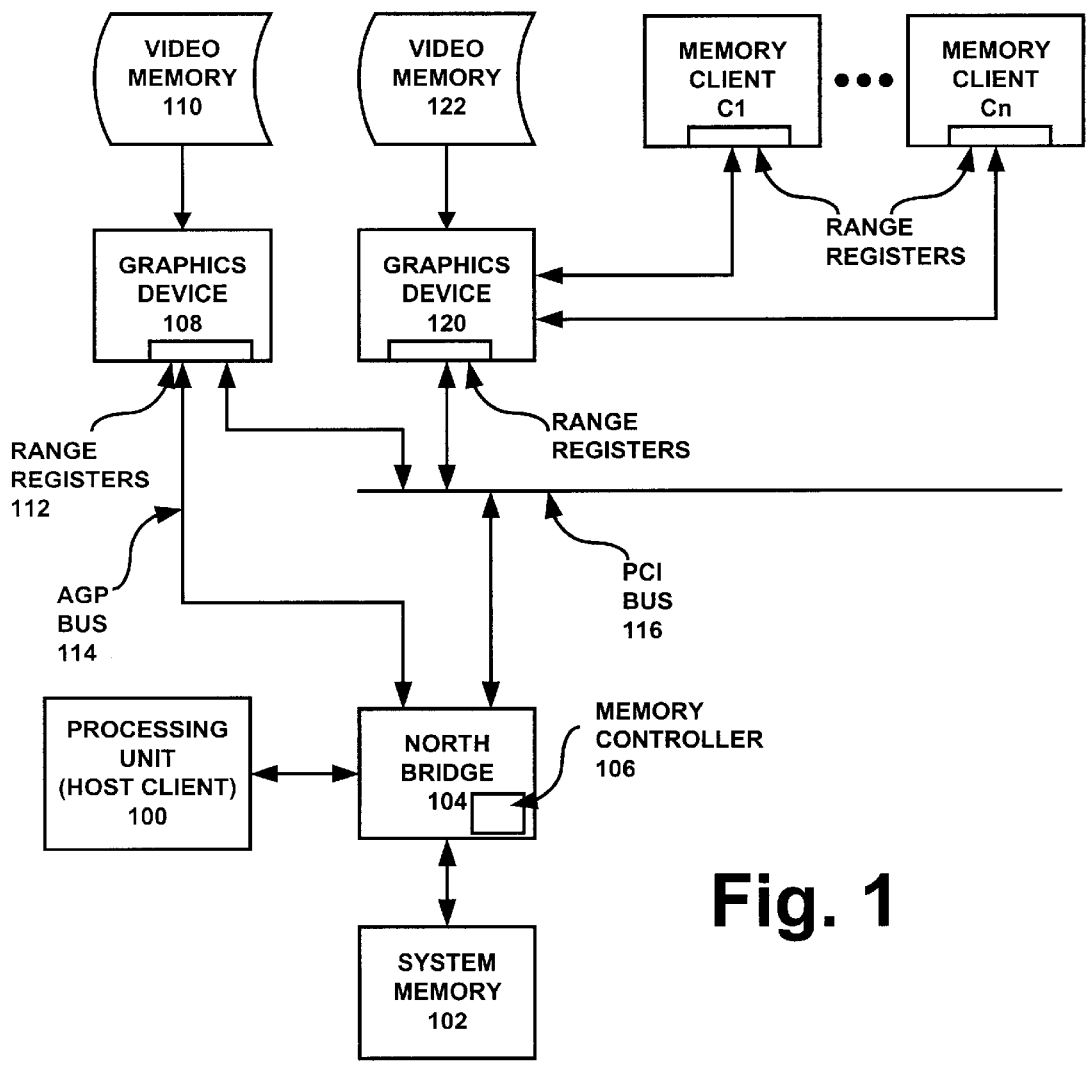
FIG. 1 is a general block diagram of a computer system using the present invention.

FIG. 1 of the drawings shows a computer system having a processing unit (host client) 100 and a system memory 102, each of which is operatively connected to what is termed in the art as a north bridge 104. A north bridge is the host/PCI bridge and is quad-ported. The north bridge 104 provides communication paths. Also associated with the north bridge 104 is a memory controller 106 according to the present invention. FIG. 1 also shows a plurality of memory clients, such as a first graphics device 108 having a video memory 110 and range registers 112. The graphics device 108 is operatively connected to an AGP bus 114 and a PCI bus 116 via the range registers 112. A second graphics device 120 has a video memory 122 and is operatively connected to the PCI bus 116. It is to be understood that the graphics device can be integrated in the north bridge 104 and/or in the processing unit 100. Other memory clients C1–Cn can also be connected to the PCI bus 116, which is connected to the memory controller 106 and the north bridge 104. Other types of memory clients used in a typical computer system are a command traffic processor client, 2D module client, 3D module client, host client, video camera client and display client, for example.

Figure 2:
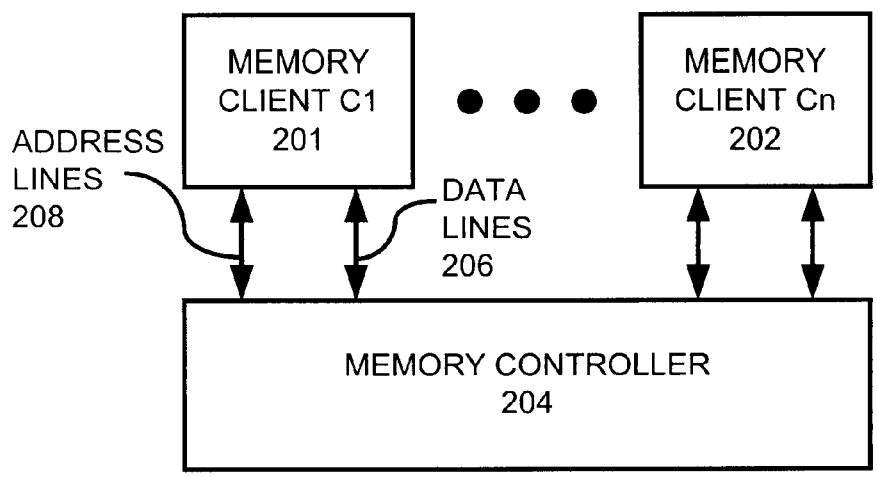
FIG. 2 is a block diagram depicting the connection of a plurality of memory clients to a memory controller.
Figure 3:
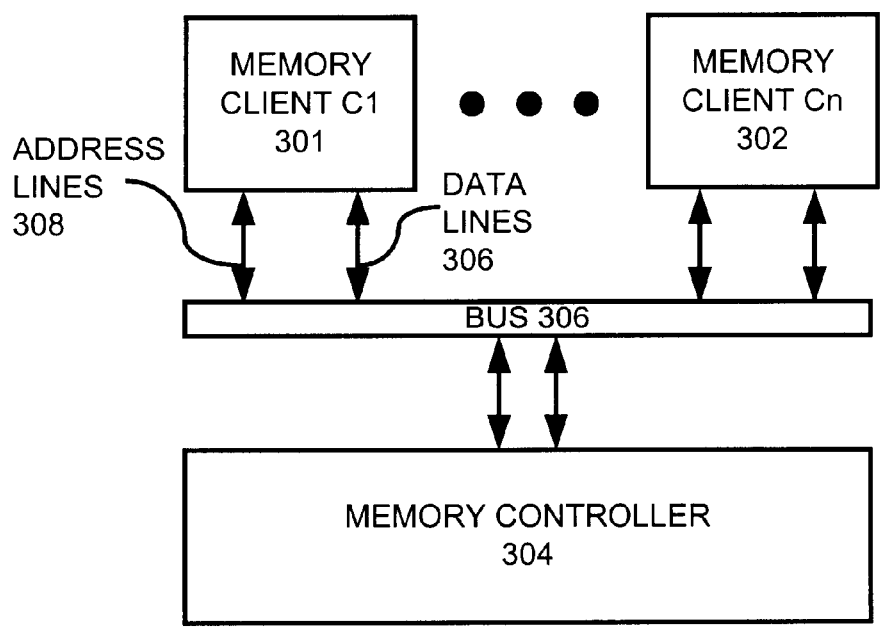
FIG. 3 is a block diagram showing an alternate connection of the memory clients to the memory controller.

FIGS. 2 and 3 show in more detail the connection of memory clients C1–Cn to the memory controller. As depicted in FIG. 2, memory clients C1–Cn 201–202, are connected to a memory controller 204 by data lines 206 and address lines 208. Alternatively, as shown in FIG. 3, the memory clients C1–Cn 301–302 have their data and address lines 306, 308 connected to the memory controller 304 via a common bus 306. Various different types of operative connections can occur between the memory clients and the memory controller. It is the function of the memory controller to control access to the virtual memory of the memory controller by the memory clients.

Figures 4, 5:
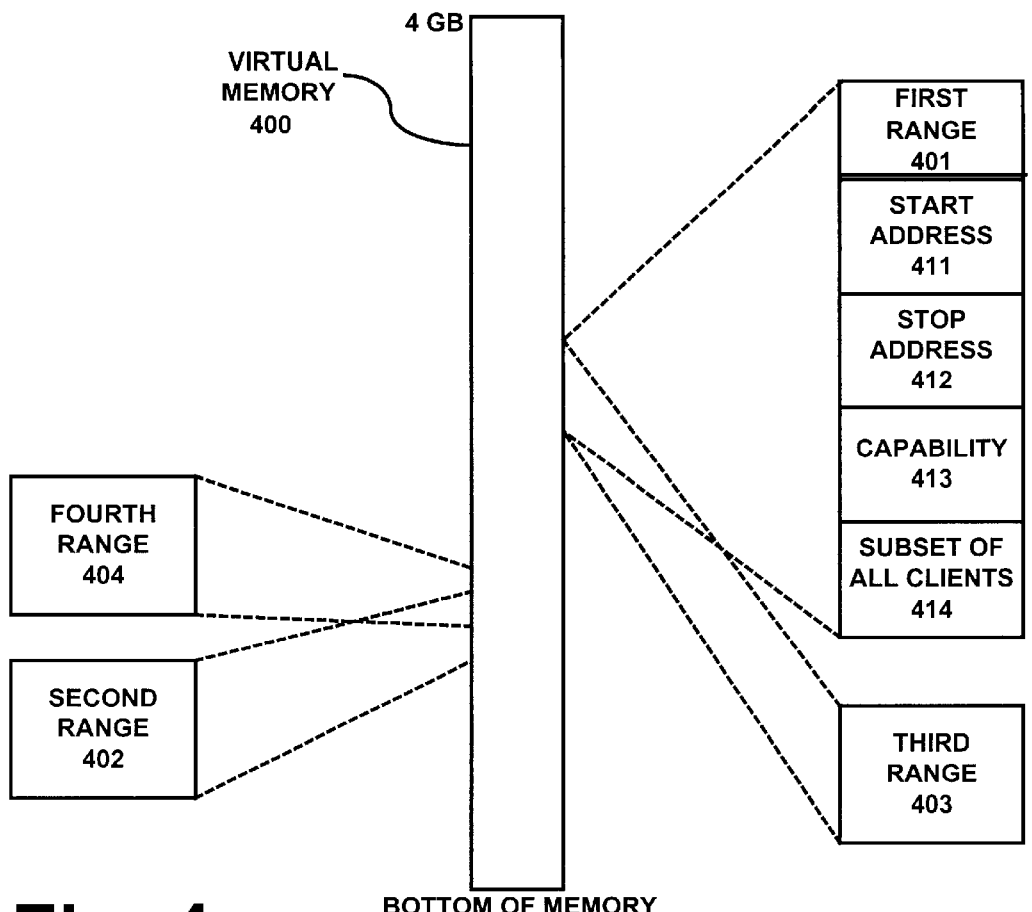
FIG. 4 depicts the use of address ranges in the virtual memory of a memory controller according to the present invention.
FIG. 5 is a diagram depicting a relationship of memory clients to capabilities in the computer system.

During operation of the computer system, the virtual memory maps into different ranges, which are used by various memory clients of the memory controller. For example, the virtual memory 400 depicted in FIG. 4 has a first range 401 which has assigned to it a start address 411, a stop address 412 (alternative to a stop address, the memory controller may assign a size identifier to the range). Associated with the first range 401 are capabilities 413 and a subset of all clients 414. The subset of all clients 414 refers to one or more memory clients of all memory clients in the computer system. It is to be understood that the total number of memory clients in the computer system is fixed. However, subsets of memory clients could dynamically change during operation of the computer. FIG. 4 also depicts a second range 402 which does not overlap the first range 401. However, it is permissible for overlaps to occur such as the first range 401 being completely overlapped (that is identical with start and stop addresses) with a third range 403. FIG. 4 also shows a fourth range 404 which only partially overlaps the second range 402.

Each client in the subset has specific capabilities, which are stored in the computer system, such as in a table in memory as depicted in FIG. 5. The term "table" is used here as a general term to refer to various structures, such as, an array containing data or a relational database. For example, for a range 500 the memory client C1 has a capability 501 of read only within the address of range 500. The client C2 has a capability 502 of only writing data to the addresses that are within the range 500. Memory client C3 has a capability 503 of both reading data from and writing data to the addresses within the range 500.

In a typical computer system there is a plurality of address ranges, which are used by the system. The address range is part of the predetermined unified address structure, such as the virtual memory 400 depicted in FIG. 4. Each of the address ranges of the plurality of address ranges has location and size identifiers. This may be a start address and a stop address, or a start address with a size identifier. Typically, a capability of the plurality of capabilities in the system is one of read only, write only and read/write. Also each range has associated therewith a number of memory clients, which is a subset of the total number of memory clients.

In one embodiment of the present invention, when the system is turned on the system initially has a default configuration in which all clients have access to all addresses in a unified address structure with all capabilities. Thereafter, the memory controller dynamically structures an association of a respective range of the plurality of ranges with at least one respective capability of a plurality of capabilities for at least one of a selective client of a plurality of clients. During ongoing operation of the computer system this dynamic structure would have a varying number of ranges as described above in which there are subsets of memory clients each of which has specific capabilities for a range of addresses of a respective range.

In a typical operation of a computer system, the operating system manages main memory. When a graphics application for a graphics device requires an allocation of a portion of main memory, it sends a request to the memory manager. This request includes a specification of a required size of the memory portion requested. In prior art computer systems the operating system reserves a currently unused block of memory of the required size, and returns a start address to the device driver of the graphics application. The device driver then supplies the start address of the assigned range to the graphics device via the bridge. This is the start address of the graphics aperture (address range).

During on-going operation of the computer system, the allocated block of memory is maintained only as long as the graphics device needs it. When it is not needed, the memory block is returned to the free memory pool of the operating system. Thus, the device driver only uses portions of the main memory as needed. The size of the aperture or address range changes on a dynamic basis. The base address may or may not change depending upon how the operating system is programmed.

Furthermore, since a large block of memory may not always be available, a graphics address relocation table is used for determining the block of memory. Whenever, for example, the AGP adapter attempts to access the graphics aperture, the north bridge first performs a memory read from the graphics address relocation table. The north bridge then uses the entry obtained to translate the address before it can perform the requested access within the aperture.

Figure 6:
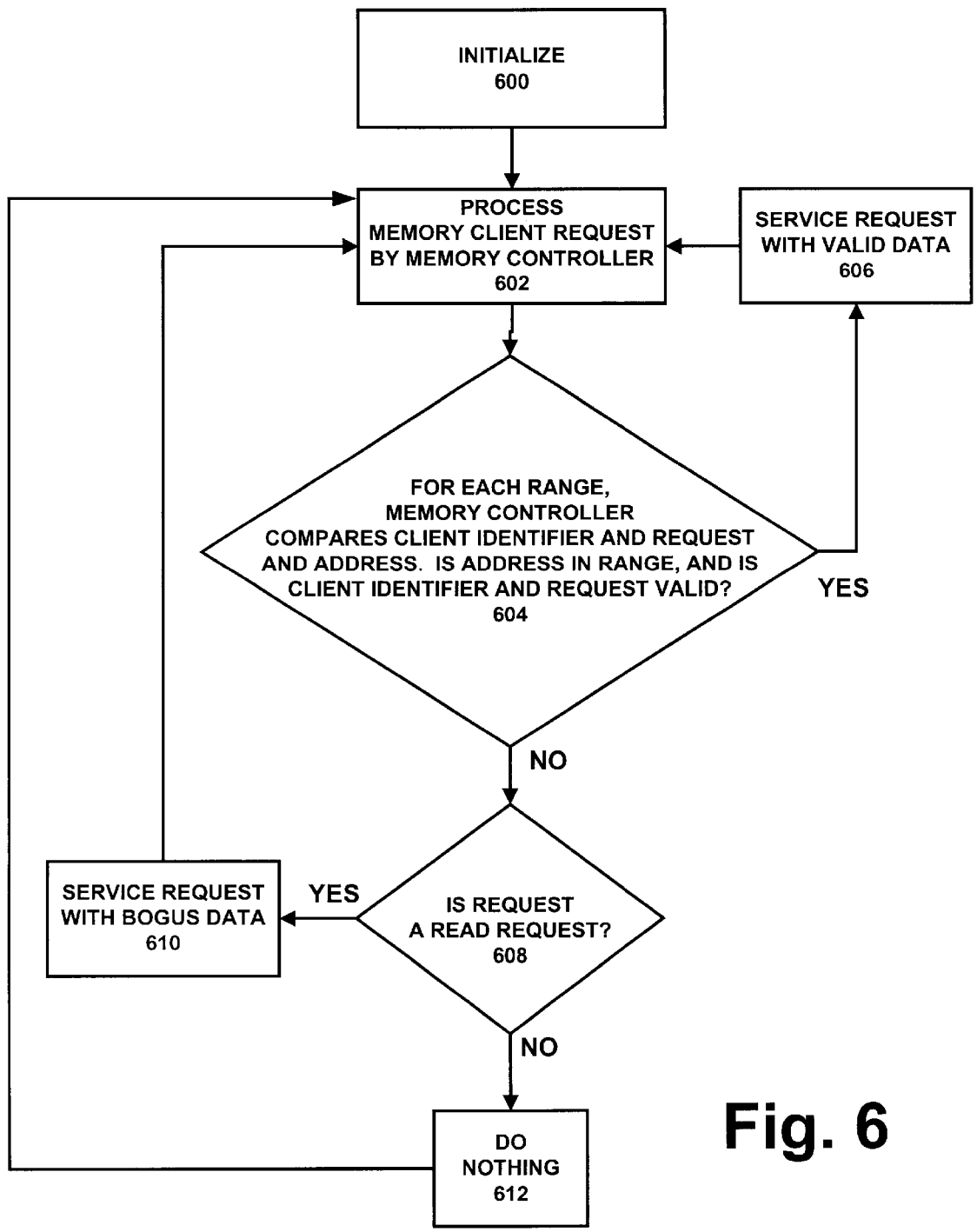
FIG. 6 is block diagram depicting the method of the present invention.

FIG. 6 depicts the operation of the present invention. In step 600 the computer system is initialized and in particular, the memory controller or address access control system dynamically structures an association of a respective range of a plurality of ranges of addresses with at least one respective capability of a plurality of capabilities for at least one client of the plurality of clients. During operation of the computer system, a memory client forwards a request to the memory controller in step 602. The memory controller in step 604 compares the request for access to an address against all address ranges. This request, for example, may be a request by a graphics device to read data from an address in a particular memory address range. If the memory controller determines that it has associated this particular memory client with the particular capability (such as reading data) with the address range identified by the memory client, then the memory controller will service the request (step 606). The memory client is then allowed to read data from the particular address or addresses within the requested range of addresses. If, however, the memory controller determines that the memory client is not to have access to this range of addresses for this capability, the memory controller in step 608 then determines if the request is for reading data from or writing data to the address range. If the request is to read data, then the request is serviced by providing bogus data to the memory client (step 610). If, however, the request is to write data to the address range, then the memory controller does nothing (step 612). This operation of the memory controller preserves data which is in the address ranges and/or prevents data from being written to or read from these address ranges. In a case when the memory client is not to have access to the particular range of addresses, it is important that the client's request not be rejected. System integrity is preserved by providing either the client with bogus data in the situation where the memory client wants to read data or by doing nothing when the memory client is attempting to write data.

Thus, the present invention fulfills the needs of the prior art with regards to preventing inadvertent, accidental or intentional reads from or writes to memory locations which could have a negative effect on system behavior. According to the present invention, the memory client requests to addresses within the address range are filtered on a per client basis as well as on a type of request operation. This overcomes the problem in the prior art because it allows restriction on a per client basis to specific address ranges within a memory pool, for a specific operation set. Thus, opportunities for negative impact on the system by memory clients are eliminated with the present invention.

The invention is not limited to the particular details in the apparatus as depicted and other modifications and applications are contemplated. Certain other changes may be made in the above-described apparatus and method without departing from the true spirit and the scope of the invention herein involved. For example, the memory controller of the present invention can be used with memory clients which are devices other than graphic devices which may be used in other types of computer systems. Also, for example, the number and location of address ranges may be fixed rather than dynamically variable, as well as, the different subsets memory clients. It is intended, therefore, that the subject matter in the above depiction should be interpreted as illustrative and not in a limiting sense.

What is claimed is:

1. A method for processing a request in an address access control system having a plurality of address ranges in a predetermined unified address structure, a plurality of memory clients operatively connected to the unified address structure, and at least one table having a plurality of capabilities with respect to clients accessing address ranges, comprising the steps of:

dynamically structuring during normal operation an association of a respective range of the plurality of ranges with at least one respective capability of the plurality of capabilities for at least one client of the plurality of memory clients;

receiving a request from a respective client of the plurality of memory clients, the request being for a predetermined operation and a predetermined address in the unified address structure;

comparing the predetermined address of the request against all address ranges, and approving the request when the predetermined address is in an address range in which the respective client is associated with a capability which corresponds to the predetermined operation of the request;

servicing the request when the request ha been approved;

determining, when the request is not approved, if the predetermined operation of the request is a read request or a write request, and for a read request, servicing the request with bogus data, and for a write request, taking no action.

2. The method according to claim 1, wherein each address range of the plurality of address ranges has location and size identifiers.

3. The method according to claim 1, wherein each address range of the plurality of address ranges has a start address and a stop address.

4. The method according to claim 1, wherein each address range of the plurality of address ranges has a start address and a size identifier.

5. The method according to claim 1, wherein a respective capability of the plurality of capabilities is one of read only, write only, and read/write.

6. The method according to claim 1, wherein the respective range has associated therewith a number of clients, which is a subset of the plurality of memory clients.

7. The method according to claim 1, wherein address ranges in the unified address structure have at least one of the following structures: at least two of the address ranges do not overlap one another; at least two of the address ranges at least partially overlap one another; and at least Two of the address ranges completely over lap one another.

8. The method according to claim 1, wherein address ranges are located in the unified address structure independent of one another.

9. The method according to claim 1, wherein a respective memory client of the plurality of memory clients is one of a command traffic processor client, 2D module client, 3D module client, host client, video capture client, and display client.

10. The method according to claim 1, wherein a respective memory client of the plurality of memory clients is one of a north bridge client and a processing unit client.

11. The method according to claim 1, wherein two respective memory clients of the plurality of memory clients are respectively a north bridge client and a processing unit client.

12. The method according to claim 1, wherein the system initially has a default configuration in which all clients have access to all addresses in the unified address structure and with all capabilities.

13. The method according to claim 12, wherein all capabilities include the capability of a client to read data from any address or range of addresses in the unified address structure, and to write data to any address or range of addresses in the unified address structure.

\* \* \* \* \*